US009694322B2

(12) United States Patent
Teysset et al.

(10) Patent No.: US 9,694,322 B2
(45) Date of Patent: Jul. 4, 2017

(54) HEXAGONAL OXIDATION CATALYST (71) Applicant: UMICORE AG & CO. KG, Hanau-Wolfgang (DE)

(72) Inventors: Olivier Teysset, Poissy (FR); Philippe Servais, Chantemelle (BE); Julie Baron, Metz (FR)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 14/770,345

(22) PCT Filed: Feb. 21, 2014

(86) PCT No.: PCT/EP2014/053465
§ 371 (c)(1),
(2) Date: Aug. 25, 2015

(87) PCT Pub. No.: WO2014/131708
PCT Pub. Date: Sep. 4, 2014

(65) Prior Publication Data
US 2016/0001226 A1 Jan. 7, 2016

(30) Foreign Application Priority Data
Feb. 27, 2013 (EP) ..................... 13156881

(51) Int. Cl.
*B01D 53/94* (2006.01)
*F01N 3/28* (2006.01)
*B01J 23/42* (2006.01)
*F01N 3/10* (2006.01)
*B01J 23/44* (2006.01)
*B01J 23/52* (2006.01)
*B01J 35/04* (2006.01)
*F01N 3/20* (2006.01)

(52) U.S. Cl.
CPC ....... *B01D 53/944* (2013.01); *B01D 53/9477* (2013.01); *B01J 23/42* (2013.01); *B01J 23/44* (2013.01); *B01J 23/52* (2013.01); *B01J 35/04* (2013.01); *F01N 3/103* (2013.01); *F01N 3/2828* (2013.01); *B01D 53/9409* (2013.01); *B01D 2255/106* (2013.01); *B01D 2255/1021* (2013.01); *B01D 2255/1023* (2013.01); *B01D 2255/91* (2013.01); *B01D 2255/9202* (2013.01); *B01D 2258/012* (2013.01); *F01N 3/2066* (2013.01); *F01N 2330/34* (2013.01); *F01N 2330/48* (2013.01)

(58) Field of Classification Search
CPC ............. B01D 53/9418; B01D 53/944; B01D 53/9413; F01N 3/103; F01N 3/2066; F01N 3/28
See application file for complete search history.

(56) References Cited

U.S. PATENT DOCUMENTS

| 4,961,917 | A | | 10/1990 | Byrne |
| 5,120,695 | A | | 6/1992 | Blumrich et al. |
| 5,143,707 | A | * | 9/1992 | Beck .................. B01D 53/9418 423/239.2 |
| 6,756,336 | B2 | | 6/2004 | Kasahara et al. |
| 6,767,855 | B2 | | 7/2004 | Kasahara et al. |
| 6,914,026 | B2 | | 7/2005 | Tran et al. |
| 7,005,116 | B2 | | 2/2006 | Schaefer-Sindlinger et al. |
| 7,576,031 | B2 | * | 8/2009 | Beutel ...................... B01J 23/44 502/326 |
| 7,645,718 | B2 | | 1/2010 | Li et al. |
| 7,875,573 | B2 | * | 1/2011 | Beutel ...................... B01J 23/44 423/213.2 |
| 7,947,238 | B2 | * | 5/2011 | Deeba .................. B01D 53/944 423/213.2 |
| 7,988,921 | B2 | | 8/2011 | Murata et al. |
| 9,333,490 | B2 | * | 5/2016 | Kazi ........................ B01J 23/44 |
| 2009/0239745 | A1 | * | 9/2009 | Yamato ................ B01D 53/944 502/339 |
| 2010/0166629 | A1 | * | 7/2010 | Deeba .................. B01D 53/944 423/213.5 |
| 2010/0183490 | A1 | | 7/2010 | Hoke et al. |
| 2011/0000975 | A1 | | 1/2011 | Gartstein et al. |
| 2012/0124975 | A1 | | 5/2012 | Wei et al. |

(Continued)

FOREIGN PATENT DOCUMENTS

DE 3940758 A1 6/1991
DE 4435073 A1 4/1995

(Continued)

OTHER PUBLICATIONS

SAE Technical Paper Series 950809, dated Feb. 27-Mar. 2, 1995, Development of New Concept Three-Way Catalyst for Automotive Lean-Burn Engines, pp. 121-130/ N. Miyoshi, S. Matsumoto, K. Katoh, T. Tanaka, J. Harada, N. Takahashi, K. Yokota, M. Sugiura and K. Kasahara.
Aachener Kolloquium Fahrzeug- und Motorentechnik 2006, NOX-Aftertreatment Systems for Diesel Engines for Series Introduction in North America, Dr.-Ing. Ina Griβtede, Dr. Stephan Bremm, Wilfried Möller, Dr. Jürgen Leyrer, Michael Gröger, p. 1369.
G. Tuenter et al., Ind. Eng. Chem. Prod. Res. Dev. 1986, 25, 633-636; Fig. 1.
International Search Report for PCT/EP2014/053465, dated Jul. 24, 2014 in English.
IQPC 3rd international conference the experience of OEM's with actual European Emission-Legislation, P. Durrieu, Sep. 26, 2011.
Autoabgaskatalyse, Christian Hagelüken, 2. Edition 2005, p. 32 (contained within provided pp. 1-3).
Doctoral thesis by Stephan Liebsch, TU Dresden 2004 (pp. 1-179).
Written Opinion for the International Searching Authority for PCT/EP2014/053465, dated Aug. 27, 2015 in English (5 pages).
International Preliminary Report on Patentability for PCT/EP2014/053465, dated Sep. 1, 2015 in English (6 pages).

*Primary Examiner* — Timothy Vanoy
(74) *Attorney, Agent, or Firm* — Smith, Gambrell & Russell, LLP (57) ABSTRACT The present invention is directed to a method of mitigating noxious exhaust pollutants in a system comprising an oxidation catalyst monolith in front of a $NO_x$ depletion device. In particular, the method of the invention proposes to use hexagonal cell geometry of the oxidation catalyst monolith in order to increase its oxidative power.

16 Claims, 8 Drawing Sheets

(56) References Cited

U.S. PATENT DOCUMENTS

| | | | |
|---|---|---|---|
| 2013/0084222 A1* | 4/2013 | Grubert | B01J 29/04 422/170 |
| 2013/0095013 A1* | 4/2013 | Banno | B01D 53/9477 423/213.5 |
| 2014/0154163 A1* | 6/2014 | Andersen | B01J 37/0244 423/237 |
| 2014/0271429 A1* | 9/2014 | Kazi | B01J 23/44 423/213.5 |
| 2015/0165422 A1* | 6/2015 | Sung | B01J 29/076 423/213.5 |
| 2015/0251169 A1* | 9/2015 | Baba | F01N 3/2828 60/274 |
| 2016/0067690 A1* | 3/2016 | Sato | B01J 37/03 502/73 |
| 2016/0214086 A1* | 7/2016 | Ano | B01J 23/42 |

FOREIGN PATENT DOCUMENTS

| | | |
|---|---|---|
| DE | 19614540 A1 | 10/1997 |
| DE | 19753738 A1 | 6/1999 |
| DE | 10238770 A1 | 3/2004 |
| DE | 10308288 A1 | 9/2004 |
| DE | 10323607 A1 | 12/2004 |
| DE | 102007060623 A1 | 6/2009 |
| DE | 102011012799 A1 | 3/2012 |
| EP | 0385164 A2 | 9/1990 |
| EP | 0427970 A2 | 5/1991 |
| EP | 0800856 A2 | 10/1997 |
| EP | 1147801 A1 | 10/2001 |
| EP | 1054722 B1 | 12/2001 |
| EP | 1317953 A1 | 6/2003 |
| EP | 1495804 A1 | 1/2005 |
| EP | 1016448 B1 | 5/2006 |
| EP | 1321186 B1 | 7/2006 |
| EP | 1867389 A1 | 12/2007 |
| EP | 1876331 A2 | 1/2008 |
| EP | 1663458 B1 | 1/2009 |
| EP | 1815112 B1 | 4/2009 |
| EP | 2042227 A2 | 4/2009 |
| EP | 2112339 A1 | 10/2009 |
| EP | 2117681 A2 | 11/2009 |
| EP | 2123345 A1 | 11/2009 |
| EP | 2181749 A1 | 5/2010 |
| EP | 2222388 A1 | 9/2010 |
| EP | 2300156 A1 | 3/2011 |
| EP | 2465606 A1 | 6/2012 |
| EP | 2466084 A1 | 6/2012 |
| EP | 2131949 B1 | 12/2013 |
| EP | 2117707 B1 | 4/2015 |
| EP | 1784258 B1 | 5/2015 |
| JP | 2002/336656 A | 11/2002 |
| KR | 2003/0005929 A | 1/2003 |
| WO | 01/02083 A1 | 1/2001 |
| WO | 2005/092481 A1 | 10/2005 |
| WO | 2006/021336 A1 | 3/2006 |
| WO | 2008/101585 A1 | 8/2008 |
| WO | 2008/106518 A2 | 9/2008 |
| WO | 2009/077126 A1 | 6/2009 |
| WO | 2009/103699 A1 | 8/2009 |
| WO | 2009/120866 A1 | 10/2009 |
| WO | 2009/129903 A1 | 10/2009 |
| WO | 2009/152971 A1 | 12/2009 |
| WO | 2010/109100 A1 | 9/2010 |
| WO | 2010/118125 A2 | 10/2010 |
| WO | 2010/133309 A1 | 11/2010 |
| WO | 2011/057649 A1 | 5/2011 |
| WO | 2011/128026 A1 | 10/2011 |
| WO | 2012/055730 A1 | 5/2012 |
| WO | 2012/065933 A1 | 5/2012 |
| WO | 2012/076648 A1 | 6/2012 |
| WO | 2012/079598 A1 | 6/2012 |
| WO | 2012/123660 A1 | 9/2012 |
| WO | 2012/140784 A1 | 10/2012 |
| WO | 2012/147376 A1 | 11/2012 |
| WO | WO 2012147376 A1 * | 11/2012 ........... B01D 53/944 |
| WO | 2013/008342 A1 | 1/2013 |

* cited by examiner

| Item | Square Cell [mil / cpsi] | | | | Hexagonal Cell | |
|---|---|---|---|---|---|---|
| | 3,5/400 | 3,5/600 | 4,3/400 | 4,3/600 | 4,3/400H | 3,5/600H |
| Porosity (%) | 35 | 35 | 35 | 35 | 35 | 35 |
| Wall Thickness (mm) | 0,090 | 0,090 | 0,110 | 0,110 | 0,110 | 0,090 |
| GSA (cm²/cm³) | 29,3 | 35,7 | 28,8 | 34,4 | 27,0 | 33,1 |

HEXAGONAL OXIDATION CATALYST

The present invention is directed to a method of mitigating noxious exhaust pollutants in a system comprising an oxidation catalyst monolith and a $NO_x$-depletion device. In particular, the method of the invention proposes to use certain geometry of the oxidation catalyst monolith in order to increase its oxidative power at least for the oxidation of NO to $NO_2$.

Future exhaust-gas legislation limits the quantity of nitrogen oxides ($NO_x$) in the exhaust gas of lean-burn engines (diesel, lean GDI) to such an extent that catalytic aftertreatment of the nitrogen oxides is necessary. The envisaged reduction of the nitrogen oxides to form nitrogen is however difficult owing to the high oxygen content in the exhaust gas of lean-burn internal combustion engines. Known methods for denitrogenation are based either on the use of nitrogen oxide storage catalytic converters ($NO_x$ storage catalyst, NSC, LNT) or are methods for selective catalytic reduction (SCR), usually by means of ammonia or HC as reducing agent, on suitable catalytic converters like SCR catalytic converters.

The mode of operation of $NO_x$ storage catalysts is described in detail in SAE document SAE 950809. The cleaning action of the nitrogen oxide storage catalysts is based on the fact that, in a lean operating phase of the engine, the nitrogen oxides are stored by the storage material of the storage catalyst, predominantly in the form of nitrates, and the nitrates formed beforehand are decomposed in a subsequent rich operating phase of the engine, and the nitrogen oxides released again are reacted with the reducing exhaust gas constituents over the storage catalysts to give nitrogen, carbon dioxide and water. Hence, nitrogen oxide storage catalysts consist of a catalyst material, which is usually applied in the form of a coating to an inert support body composed of ceramic or metal. The catalyst material of the nitrogen oxide storage catalyst comprises at least one nitrogen oxide storage material and a catalytically active component. The nitrogen oxide storage material in turn consists of the actual nitrogen oxide storage component, which is deposited on a support material in highly dispersed form.

The catalytically active components present in the catalyst material of the nitrogen oxide storage catalyst have the task of converting the carbon monoxide and hydrocarbon pollutant gases present in the lean exhaust gas to carbon dioxide and water. In addition, they serve to oxidize the nitrogen monoxide present in the exhaust gas to nitrogen dioxide, in order that it can react with the basic storage material to give nitrates. For this purpose, the noble metals of the platinum group, especially platinum, are usually used, which are generally deposited separately from the storage components on a separate support material. The support materials used for the platinum group metals in nitrogen oxide storage catalysts are often high-surface area oxides, which may have distinct basicity. In order to generate a sufficient storage of nitrogen oxides advantageously an amount as high as possible of nitrogen oxides have to be present in the form of $NO_2$ to be stored as nitrates. Methods to achieve this may use an oxidatively active catalyst in addition to and upstream of the respective NOx storage catalyst (15. Aachener Kolloquium Fahrzeug- and Motorentechnik 2006, NOX-Aftertreatment Systems for Diesel Engines for Series Introduction in North America, Dr.-Ing. Ina Griβtede, Dr. Stephan Bremm, Wilfried Müller, Dr. Jürgen Leyrer, Michael Gröger, p 1369).

A next preferred process for the removal of nitrogen oxides from lean-burn engine exhaust gases is the so called ammonia SCR process. Here, the amount of nitrogen oxides present in the exhaust gas is decreased with the aid of a reducing agent introduced into the exhaust gas train from an external source. Ammonia or a compound which can be decomposed into ammonia, e.g. urea or ammonium carbamate, is preferably used as reducing agent. The ammonia, which may have been generated in situ from the precursor compound, reacts over the SCR catalyst with the nitrogen oxides in the exhaust gas in a comproportionation reaction to form nitrogen.

Figure 1:
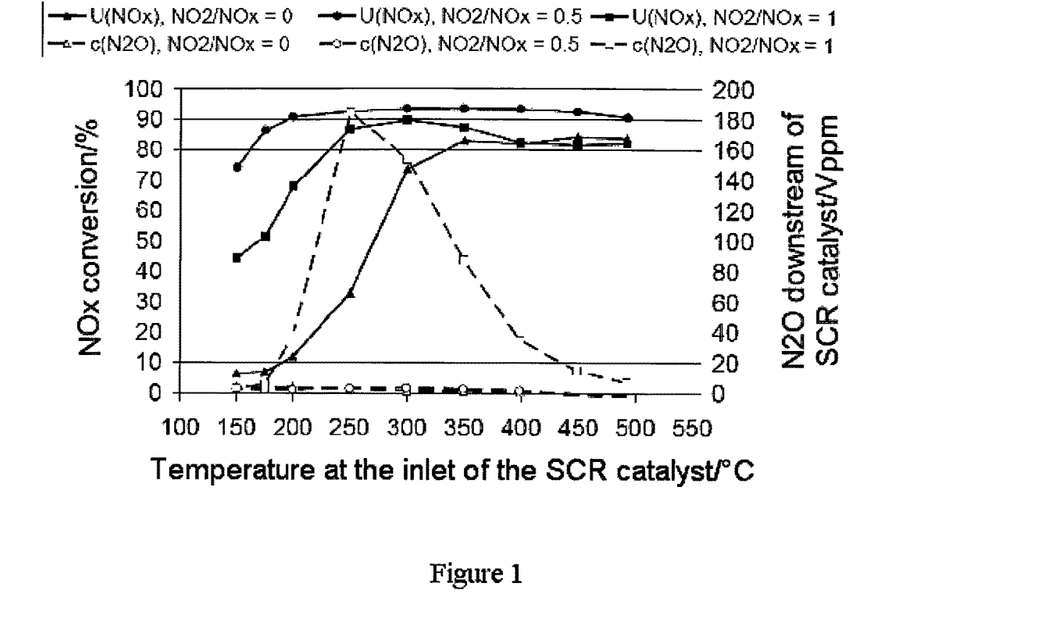
FIG. 1: dependence of the nitrogen oxide conversion and the selectivity of the reduction of nitrogen oxide over a conventional reduction catalyst based on an iron-exchanged zeolite on the molar $NO_2/NO_x$ ratio at $\alpha=NO_x/NH_3=0.9$ and a space velocity of 30 000 L/h;
catalysts were examined in the freshly prepared state on a model gas test bench using a defined model gas composition; the curves marked by solid symbols and continuous lines show the $NO_x$ conversion, the curves represented by the corresponding open symbols and broken lines show the respective $N_2O$ concentrations in the exhaust gas downstream of the catalyst; in the graphs:
(●)/(o) are measured values for $NO_2/NO_x=0.5$;
(▲)/(Δ) are measured values for $NO_2/NO_x=0 \rightarrow NO_x=NO$ and
(■)/(□) are measured values for $NO_2/NO_x=1 \rightarrow NO_x=NO_2$

It is known that the efficiency of the SCR catalyst increases with increased amount of reducing agent. However, the risk of $NH_3$ breakthrough over the SCR catalyst also increases with increased $NH_3$ content leading to unpleasant secondary emissions of $NH_3$. Furthermore, at low temperatures optimal nitrogen oxide conversions are achieved only when nitrogen monoxide and nitrogen dioxide are present in equimolar amounts ($NO/NO_2=1$) or the ratio of $NO_2/NO_x=0.5$ (G. Tuenter et al., Ind. Eng. Chem. Prod. Res. Dev. 1986, 25, 633-636; FIG. 1; EP1147801A; EP2222388A). FIG. 1 shows, by way of example, model gas results of a conventional SCR catalyst based on an iron-exchanged zeolite which illustrate the dependence of the nitrogen oxide conversion and the selectivity of the reaction on the $NO_2/NO_x$ ratio at $NO_x/NH_3=0.9$. It can be seen clearly that only at an $NO_2/NO_x$ ratio of 0.5 nitrogen oxide conversion of about 90% are achieved over the entire temperature range from 200 to 500° C. The greatest influence of the $NO_2/NO_x$ ratio is observed in the low-temperature range up to 250° C. If little or no $NO_2$ is present in the test gas introduced, as is usually the case for raw exhaust gas, virtually no conversions are observed below 200° C. On the other hand, if the $NO_x$ consists entirely of $NO_2$, high conversions are achieved at 250° C., but analysis of the exhaust gas downstream of the catalyst shows that the reduction of significant amounts of $NO_2$ does not lead to non-polluting nitrogen but to laughing gas $N_2O$. Optimal conversions commencing at 75% conversion at as low as 150° C. with simultaneous optimal selectivity towards nitrogen are achieved according to the stoichiometry of the reaction equation (I)

$$2NH_3+NO+NO_2 \rightarrow 2N_2+3H_2O \qquad (I)$$

at an $NO_2/NO_x$ ratio of 0.5 only. This applies not only to SCR catalysts based on iron-exchanged zeolites but to all conventional, i.e. commercially available, SCR catalysts. However, as stated above, only small amounts of $NO_2$ are present in the primary exhaust gas from lean-burn engines. The ratio of $NO_2$ to total $NO_x$ here is significantly less than 0.5.

At present, a combination of various exhaust gas purification units is indispensable in order to meet the forthcoming legal obligations. An apparatus for the purification of lean-burn engine exhaust gases should therefore comprise an oxidation-active catalyst and, for the removal of nitrogen oxides, a $NO_x$ depletion device, like an SCR catalyst system with an SCR catalyst, an upstream metering facility for reducing agent (preferably ammonia or urea solution) and external reducing agent source (for example an additional tank containing appropriate aqueous solutions) or a $NO_x$ storage catalyst. In order to keep the particle emissions sufficiently low to meet future legislation the additional use of an optionally catalytically active particle filter is possible.

EP1054722B1 describes the so called SCRT®-system for the treatment of HC-, CO-, $NO_x$- and particle-containing lean-burn exhaust gases from an internal combustion engine, in which an oxidation catalyst monolith is located upstream of a particle filter. A reducing agent source and a metering facility for the reducing agent and also an SCR catalyst are arranged downstream of the particle filter. In the process described here, the proportion of $NO_2$ in the exhaust gas and thus the $NO_2/NO_x$ ratio is increased by at least partial oxidation of NO over the oxidation catalyst, with the $NO/NO_2$ ratio preferably being "set to a predetermined level which is optimal for the SCR catalyst" (cf. claim 11 of the patent text). However, this optimal level mentioned is achieved only to an unsatisfactory extent in the process described here. The degree of conversion of NO into $NO_2$ upstream of the SCR catalyst or a $NO_x$ storage catalyst is determined by the type and nature of oxidative power of a respectively active catalyst, its state of aging, the exhaust gas temperature and the oxygen partial pressure in the raw emission—just to mention a few parameters. The latter two parameters directly determine the position of the equilibrium of the oxidation reaction and thus the maximum $NO_2/NO_x$ ratio which can be achieved. Composition and state of aging of the oxidation catalyst determine the minimum exhaust gas temperature at which the activation energy necessary for commencing the oxidation reaction is reached and the catalyst "lights off", meaning that the light-off temperature is achieved.

Figure 2:
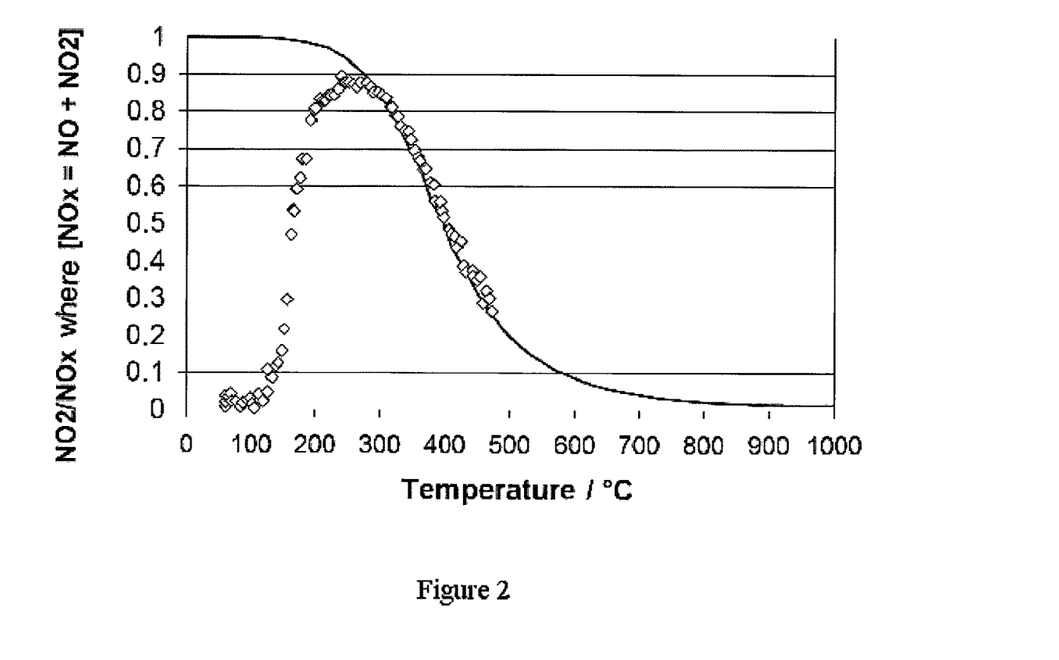
FIG. 2: relationship between the exhaust gas temperature and the molar $NO_2/NO_x$ ratio established over a conventional, platinum-containing oxidation catalyst, measured in a component-reduced model gas having an oxygen content of 6% by volume;
continuous line=calculated equilibrium position of the reaction $NO+\frac{1}{2}O_2 \rightarrow NO_2$
(◇)=measured molar $NO_2/NO_x$ ratio where $NO_x=NO+NO_2$ over a conventional Pt-based oxidation catalyst.
Figure 3:
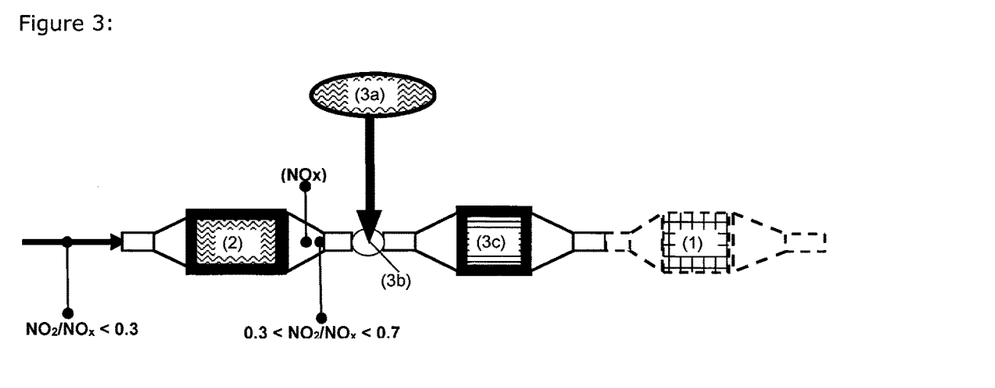
FIG. 3: example of an exhaust gas purification system for carrying out the process of the invention in a preferred embodiment; here, the reference numerals have the following meanings.

FIG. 2 shows, by way of example, the relationship between exhaust gas temperature and the $NO_2/NO_x$ ratio established in a model gas over a conventional, platinum-containing oxidation catalyst at an oxygen content of 6% by volume. The continuous line shows the position of the equilibrium of the oxidation reaction as a function of temperature. At low temperatures up to just below 200° C., the equilibrium is completely on the side of $NO_2$ formation. Above 700° C., $NO_2$ is no longer stable and only NO is now present. The $NO_2/NO_x$ ratio passes through 0.5 at about 400° C. The curve shown by the measurement points shows the molar $NO_2/NO_x$ ratios actually established in a component-reduced model gas over a freshly prepared, conventional, platinum-containing oxidation catalyst. The catalyst "lights off" only at about 140° C. The degree of formation of $NO_2$ then increases sharply with increasing temperature until the equilibrium line is reached at about 280° C. Values for an $NO_2/NO_x$ ratio of 0.5 are achieved at about 160° C.-180° C. first. Thermal aging of the catalyst and the presence of other oxidizing exhaust gas components lead to an increase in the NO light-off temperature with a simultaneous decrease in the oxidation activity. As aging increases, the equilibrium curve is reached only at ever higher exhaust gas temperatures. FIG. 2 in combination with FIG. 1 thus makes it clear that the optimal ratio of $NO_2/NO_x$ for SCR or NSC is established at elevated exhaust temperatures only leading to undesired $NO_x$ emissions under driving conditions where exhaust gas is below this temperature.

It is common to all the exhaust gas purification systems for engine exhaust gases that the exhaust gas purification units are coupled to one another and to the respective operating state of the engine both thermally and chemically, i.e. based on the composition of the exhaust gas. The operating state of the engine fixes the composition of the raw exhaust gas and thus the amount of the oxidant and reducing agent available in the exhaust gas and also substantially determines the temperature of the downstream catalysts. The efficiency of the exhaust gas purification units themselves therefore depends critically on the continually changing operating point of the engine. In view of the reduction of $NO_x$-emissions via SCR catalysts this is even more pronounced within low temperature phases of the engine (FIG. 1).

Further parameters influencing the $NO_2/NO_x$ ratio occur when the exhaust gas purification system additionally contains, as in EP-B-1054722, exhaust gas purification units, for example a particle filter, between the oxidation catalyst monolith and the SCR or NSC stage. In this case, $NO_2$ is consumed during passage of the exhaust gas through the particle filter if the filter is at least partly laden with soot. The strong oxidant $NO_2$ then reacts with soot to form CO or $CO_2$ and NO, so that the $NO_2/NO_x$ ratio is reduced again. This occurrence is also known to those skilled in the art as the "CRT effect" (CRT®=Continuous Regenerating Trap). The degree to which the $NO_2/NO_x$ ratio is reduced depends on the state of loading of the particle filter, the $NO_2$ content of the exhaust gas and the exhaust gas temperature. In such a system arrangement, supply of enough $NO_2$ to the SCR or NSC stage in accordance with above mentioned requirements can hardly be ensured over the entire operation time of the motor vehicle. In particular under cold engine conditions the exhaust considerably lacks in $NO_2$ content.

In summary, it can be seen that the concentration of $NO_2$ in the exhaust gas in the systems of the prior art (e.g. EP-B-1054722) depends heavily on the operating point of the engine, the temperature and the composition of the raw exhaust gas and is also influenced by type, number and activity of the exhaust gas purification units installed upstream of the NOx depletion device, e.g. on the variable particle loading of an upstream particle filter. Owing to the many influencing parameters, conditions so optimal that the abovementioned preferred $NO_2/NO_x$ ratio is present upstream of the SCR or NSC catalyst can prevail only comparatively rarely over the entire driving spectrum for a fixed design of the components of the system.

In addition, it is to be expected that future engine concepts will be optimized to achieve lower fuel consumption. This means that the efficiency of the engines will be improved further, as a consequence of which the average exhaust gas temperatures both of diesel engines and of spark-ignition engines operated under lean conditions will be reduced further. As FIG. 1 shows, the degree of conversion of $NO_x$ over the SCR catalyst at low exhaust gas temperatures, i.e. in the range from 150 to 300° C. is determined decisively by the $NO_2/NO_x$ ratio. Besides the need to create further SCR catalysts with outstanding low temperature activity (WO2012065933A; WO2012076648A) or $NO_x$ storage catalysts with wider application range and effective storage capacities (WO13008342A1, WO12140784A1) several strategies nowadays exist to address the problem of establishing an appropriate $NO_2/NO_x$ ratio at low exhaust gas temperatures, e.g. during idling, slow driving or under starting conditions. For example, oxidation catalyst monoliths are positioned as close as possible to the engine outlet to reach a faster light off and, thus, to produce more $NO_2$ under mentioned driving conditions. Furthermore, the chemistry and formulation of the oxidation catalysts has been modified in order to gain oxidative power for the low temperature oxidation of exhaust pollutants (WO2012055730A and literature cited therein; WO10133309A; WO10118125A; US20110000975A). Also an additional particulate trap positioned downstream of the oxidation catalyst monolith has been rendered catalytically active in order to further increase the NO2 content in the exhaust of lean combustion engines. To change the order of components in the SCRT® system is also a viable approach (EP2112339A; IQPC 3rd international conference The experience of OEM's with actual European Emission-Legislation, P. Durrieu, 2011 Sep. 26

The present invention is directed to a different way of establishing an appropriate $NO_2/NO_x$ ratio in the exhaust of a lean burn engine in front of a $NO_x$ depletion device, in particular already at relatively low exhaust temperatures. Moreover, the process of the invention should make it possible to guarantee a significantly reduced $NO_x$ emission over a greater range of the driving spectrum and thus reduce the total emission of pollutants while continuing to achieve good values for the HC and CO emissions from an economically advantageous perspective.

According to the present invention in a method for abatement of noxious pollutants of lean combustion engines using an oxidation catalyst for the oxidation of hydrocarbons, carbon monoxides and nitrogen oxides in front of a $NO_x$ depletion device, the oxidation catalyst is applied in and/or on a flow-through monolith having hexagonal cell geometry and is featuring a certain gradient of platinum metal in the washcoat in a sense, that at the bottom of the washcoat, i.e. at the side of the hexagonal flow-through substrate surface, less platinum metal concentration prevails than at the inner surface of the washcoat, i.e. at the boarder to the exhaust gas. In the following, if not otherwise indicated when talking about oxidation catalyst monoliths, it will be understood to denote the monolith with the oxidation catalyst in and/or on it, meaning that the oxidation catalyst can be present on the walls of the honeycomb monolith, i.e. in form of a washcoat or can be positioned in holes of the porously structured walls of the monolith like indicated below or both. Another embodiment of the present invention is directed to an aftertreatment system for performing the method of this invention.

Figure 6:
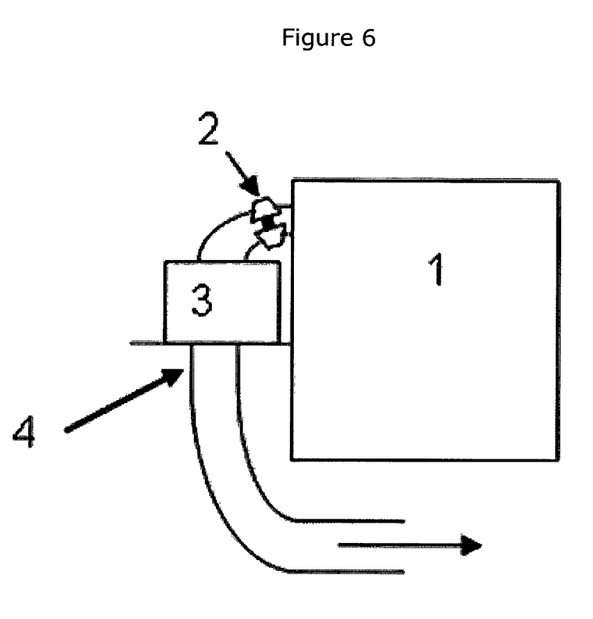
FIG. 6: schematic drawing of position of the oxidation catalyst in the exhaust pipe of an engine
1 Diesel engine
2 Turbo charger
3 Oxidation catalyst
4 $NO_x$ measurement
Figure 7:
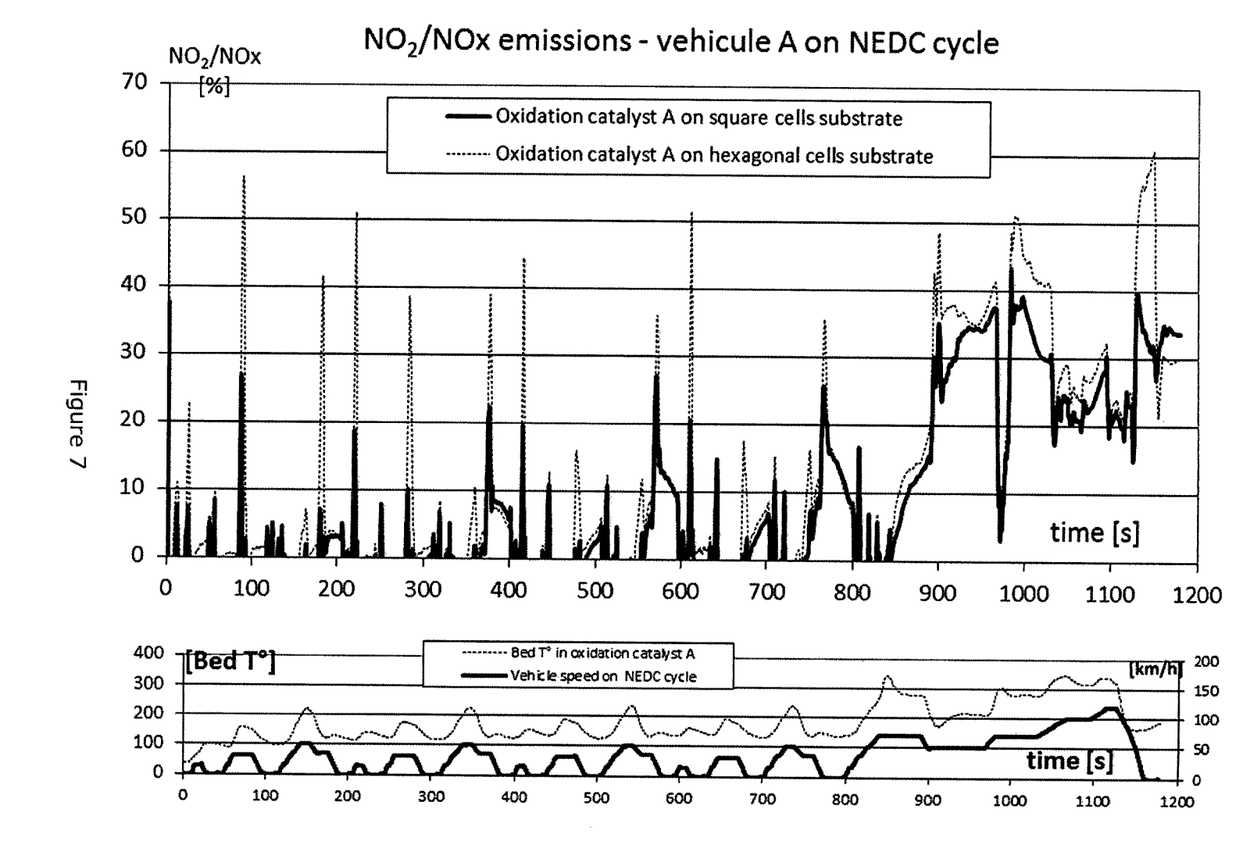
FIG. 7: comparison of $NO_2$ formation with oxidation catalyst A on hexagonal cells versus square cells on vehicle A; with Pt gradient
Figure 9:
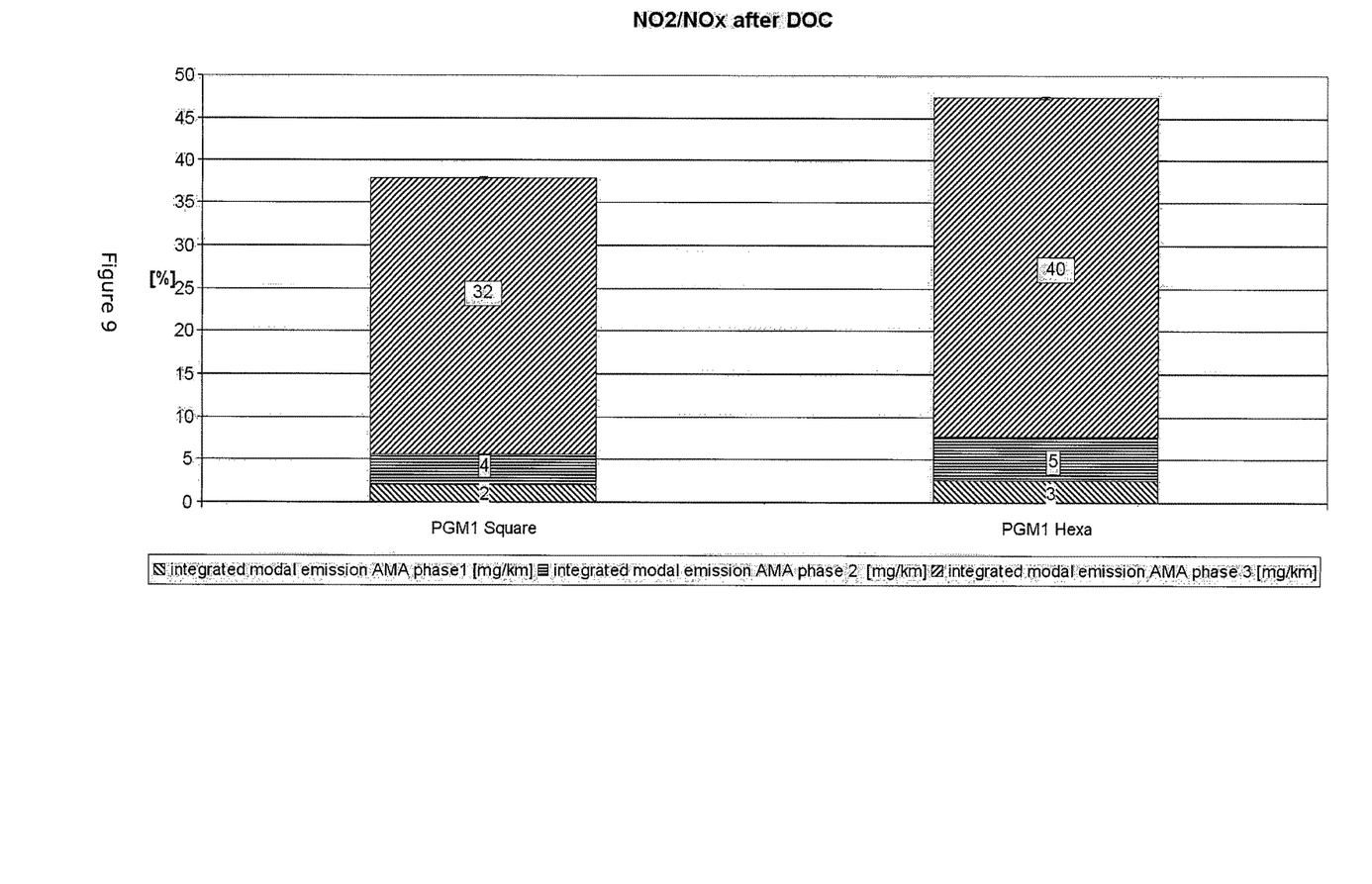
FIG. 9: experimental result of measurement of $NO_2$ with hexagonal and rectangular oxidation catalyst monolith of same dimension and same washcoat at same load; with Pt gradient

Differently shaped monolith types are known for automotive catalyst applications (Autoabgaskatalyse, Christian Hagelüken, 2. Edition 2005, p. 32). Monoliths having hexagonal cell geometry are commercially available (e.g. NGK—Honeyceram®, Corning—Celcor®, Denso). In addition, hexagonal monoliths as carriers for catalyst in exhaust aftertreatment processes have already been disclosed (e.g. U.S. Pat. No. 7,988,921B, KR20030005929A, EP1867389A). However, hitherto nothing was known about the better ability of respectively shaped oxidation catalyst monoliths in order to oxidize NO to $NO_2$ in the exhaust of lean burning combustion engines. As can be seen from FIG. 9, by switching from an equally dimensioned rectangular monolith to one having hexagonal geometry a considerably better oxidation of NO can be achieved, despite using equal amounts of the same washcoat. It has to be said that other pollutants at least are not less favorably oxidized with the hexagonal monolith compared to the rectangular one. The advantage gained by instant invention is, in particular, the increase of oxidative power on NO in the exhaust which in turn may lead to a better low temperature oxidation of NO and to a more favorable $NO_2/NO_x$ ratio in front of a $NO_x$ depletion catalyst, advantageously already at relatively low temperatures. In the alternative, an equal oxidative power can be achieved using less washcoat load or a lesser amount of precious metals which is very advantageous from a cost perspective. Very surprisingly it has been found that the oxidation catalysts monolith used in the present invention show a far better dynamic or transient behaviour than the rectangular devices (FIGS. 6, 7).

Commercially available monoliths normally have cell densities of from 200-1200 cpsi (cells per square inch; equal to 31-186 cells/cm²). Terminology of the monoliths is often given in numbers, like 400/6.5. 400 nominates the cpsi, while 6.5 stands for the thickness of the wall in "mil" (1 mil=¹⁄₁₀₀₀ inch). The amount of cells of the oxidation catalyst monolith is chosen by the skilled worker. He orientates himself on the ability to establish a high oxidative force but on the other hand to manage the increasing backpressure when cell densities are getting higher. Monoliths having cell densities of up to 1500 cpsi are known. In an advantageous embodiment of the present invention, however, the oxidation catalyst monolith has a cell density from 30-140 cells/cm², preferably between 40-100 cells/cm² and most preferably between 60-95 cells/cm².

Normal oxidation catalyst monoliths comprise a certain length in order to allow the exhaust gas to sufficiently contact the monolith walls and, hence, the catalytic material in and/or on the wall on its way through. In view of the present invention the oxidation catalyst monolith has a length of from 3.5-30 cm, preferably, of from 4.5-20 cm and most preferably of from 7.5-16 cm.

Figure 5:
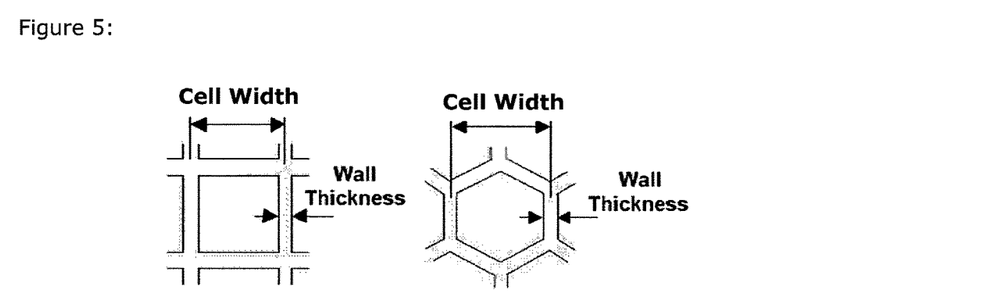
FIG. 5: visual explanation of cell pitch and wall thickness

Oxidation catalyst monoliths of the invention have normal wall thicknesses used in the art (FIG. 5). According to the present invention the wall thickness ranges of from 50 μm-250 μm, preferably 75-200 μm and most preferably of from 80-160 μm. The cell width (FIG. 5) is dependent from the cell density and the wall thickness of the monolith in question and should lie within a range of from 0.5-2.0 mm, preferably 1.0-1.5 mm and most preferably 1.1-1.4 mm.

The oxidation catalyst of the invention can likewise be configured as required by a person skilled in the art. When talking about an oxidation catalyst being used in and/or on a flow-through monolith one understands that the oxidatively active catalyst coating can reside either in a washcoat layer on the interior walls of the monolith or in little pores in the wall of the monolith having a certain kind of porosity (EP2131949A). Both types of configuration can be applied simultaneously. It should also be considered that the oxidation catalyst can be present in a layered or zoned format on the monolith in question. Washcoat in the sense of this invention in general determines the ultimate slurry being applied to the substrate monolith and encompassing all materials necessary to generate the final catalyst, a post-impregnation step may be possible though.

The oxidation catalyst advantageously comprises precious group metals as oxidatively active components selected from the group consisting of platinum, palladium, gold, rhodium and combinations thereof on high surface area refractory oxides. Advantageous catalysts are outlined in WO2009120866A, EP2123345A, EP2300156A, and WO2011057649A. Preference is given to the oxidation catalyst not containing any further noble metals apart from platinum, palladium, gold or mixtures thereof. Most preferably the only precious metals present are platinum and palladium. In particular and preferably, the oxidation catalyst should not contain any rhodium. The oxidation catalyst may advantageously have further functions such as NOx storage function, HC storage function, oxygen storage function or a three-way function, the latter prevailing under rich or stoichiometric exhaust conditions. Very particular preference is given to the oxidation catalyst performing a NOx storage function. Further suitable embodiments in this regard can be found in the patent applications DE10308288A1, DE19614540A1, DE19753738A1, DE3940758A1, EP427970A2, DE4435073A1.

It is possible to use, for example, conventional oxidation catalysts comprising an oxidatively active catalyst coating on and/or in the monolith. The oxidation catalyst monolith and in particular its oxidatively active catalyst coating can preferably comprise oxidatively active components in a molar ratio of platinum to palladium in the range of from 1:0 to 1:3, in particular from 1:1 to 6:1. Examples of oxidatively active catalyst coatings may also be found in the above-mentioned patent applications.

As regards suitable support materials for use in the abovementioned oxidation catalyst, reference may be made to high surface area refractory oxides, e.g. alumina or titania or ceria or zirconia or mixtures thereof. In EP0800856A the support described there comprises a zeolite mixture composed of a plurality of zeolites having different moduli and platinum group metals and also further metal oxides from the group consisting of aluminum silicate, aluminum oxide and titanium oxide, with the aluminum silicate. The concentration of the precious group metals on the oxidation catalyst monolith according to the invention can be in the range from 0.05 to 1% by weight based on the whole oxidation catalyst monolith material. Preference is given to a range of 0.2-0.8% by weight and particularly preferably 0.35-0.7% by weight.

A further example in this context is U.S. Pat. No. 6,767,855. There and in the documents cited therein, single-layer and multilayer catalysts which contain zeolites as hydrocarbon-absorbing material and also catalytically active noble metals of the platinum group (platinum, palladium, rhodium, iridium and ruthenium) which are preferably deposited on aluminum oxide are described. U.S. Pat. No. 6,756,336 describes, as does U.S. Pat. No. 6,767,855, single-layer and multilayer catalysts which contain zeolites as hydrocarbon-absorbing materials and are suitable for the purposes of the invention.

The present invention focuses on a special oxidation catalyst to be used in instant process. The oxidation catalyst is featuring a certain gradient of platinum in the washcoat in a sense that at the bottom of the washcoat, i.e. at the side of the hexagonal flow-through substrate surface, less platinum concentration prevails than at the inner surface of the washcoat, i.e. at the boarder to the exhaust gas. This measure can be achieved through, e.g. coating of two or more layers of washcoat with ever growing platinum metal content or through depositing one or more washcoat layers on the substrate with subsequent impregnation with growing platinum metal concentration. These processes are known to the skilled worker. In a further preferred aspect the platinum metal content at the bottom of the washcoat has a concentration of at most half of the concentration present at the inner surface of the washcoat. Preferred is a ratio of ≤1:3, most preferred ≤1:4 in this respect. In a most preferred aspect the oxidation catalyst comprises a two layer format in which the layers display the gradient mentioned above, preferably a platinum metal concentration ratio as just mentioned. Further precious group metals can be present in the washcoats and their concentration ratio can be applied, preferably as such that a total precious group metal concentration gradient is used opposite to that of the platinum metal gradient. That means that at the bottom of the washcoat, i.e. at the side of the hexagonal flow-through substrate surface, more precious group metal concentration prevails than at the inner surface of the washcoat, i.e. at the boarder to the exhaust gas. This holds true in particular and advantageously for the Pd content in the oxidation catalyst.

A significant further control parameter for the stated $NO_2/NO_x$ ratio is, apart from the temperature in the oxidation of the exhaust gases over the oxidation catalyst monolith at which NO is oxidized to $NO_2$ and CO and HC components are also oxidized to $CO_2$ and $H_2O$, the oxygen content of the exhaust gas. This parameter can, if appropriate, be predetermined in a targeted manner by sensors connected to the electronically controlled engine control unit. Thus, it is possible to set the oxygen content in the exhaust gas in a control circle as a function of the temperature prevailing at the oxidation catalyst site.

In a preferred aspect the present invention focuses on the fact that the $NO_x$ depletion device is an ammonia SCR catalyst system or a $NO_x$ storage catalyst. For both $NO_x$ depletion devices different $NO_2/NO_x$ ratios are needed to generate an as high as possible $NO_x$ reduction. The parameters mentioned above can be regulated according to the skilled workers knowledge so that the molar $NO_2/NO_x$ ratio directly upstream of the SCR catalyst is increased to values of from about 0.3 to 0.7, if possible independently of the temperature of the oxidation catalyst monolith. Particular preference is given to setting a range from about 0.4 to 0.6, very particularly preferably a value of from about 0.45 to 0.55. In view of $NO_x$ storage catalysts the $NO_2/NO_x$ ratio directly upstream the catalyst shall be preferably as high as possible under the economical aspect of as few as possible precious group metal content being involved. The skilled reader knows how to render the complete system most effective in this regard. E.g. after the exhaust gas has been treated with the oxidation catalyst monolith, quite easily a ratio of $NO_2/NO_x$ of from 0.5 to 0.95, preferably of from 0.6 to 0.9 and most preferred of from 0.7 to 0.9 can be reached in the exhaust gas stream at mentioned temperature ranges below without imposing additional oxidative power by incorporation of extraordinary amounts of precious group metals like e.g. platinum compared to rectangular designs (FIGS. 6, 7).

To minimize the temperature dependence in the low temperature range further and to establish the just mentioned $NO_2/NO_x$ ratios even more favourably, it can be useful to subject the oxidation catalyst monolith to heat treatment so that a uniform temperature can be set over various operating points of the engine, which in turn leads to a more uniform $NO_2/NO_x$ ratio. The temperature set in the oxidation catalyst monolith is preferably 100° C.-500° C., more preferably 200-450° C. and particularly preferably 250° C.-400° C. The heat treatment can be carried out by methods known to those skilled in the art, for example by means of engine measures such as after-injection and throttling for heating or dethrottling and increased exhaust gas recirculation for cooling and also by electric heating or cooling by means of heat exchangers (DE102007060623A).

In order to mitigate $NO_x$ emissions, as already said the $NO_2$ enriched exhaust gas can e.g. be treated with an SCR catalyst system. The latter denominates the combination of reducing agent supply from an external reducing agent source via certain injection means plus the downstream SCR catalyst. Hence, a reducing agent is introduced into the exhaust gas either subsequent of the oxidation catalyst monolith or after it has left the optional intermediate and preferably catalytically active particulate trap. As reducing agents, it is possible to employ all agents which a person skilled in the art would consider for this purpose. In particular, the use of aqueous solutions of ammonia, urea or ammonium carbamate, ammonium nitrate or other materials which liberate ammonia under the given conditions is possible here. These can be taken from a reservoir which is known per se to those skilled in the art and added to the exhaust gas stream in a suitable way. The addition can be effected by means known to those skilled in the art.

The optimal ratio of $NH_3/NO_x$ is set by injection devices so that very complete conversion of the nitrogen oxides into $N_2$ can occur with less $NH_3$ slip. If $NH_3$ slip is still an issue known slip-catalysts can be installed downstream of the SCR system (see below).

The reaction of $NH_3$ with $NO_x$ can be carried out over SCR catalysts known to those skilled in the art. Nitrogen oxides are converted in a selective fashion into non-hazardous nitrogen over these catalysts under reducing conditions. Suitable SCR catalysts and apparatuses are described by way of example in EP2465606A, DE102011012799A, DE10308288A, EP385164A, U.S. Pat. No. 4,961,917, EP1495804A, EP1147801A and U.S. Pat. Nos. 7,005,116 or 6,914,026. In this context, particular preference is given to iron- or copper-exchanged zeolites or zeolytic material or materials in which transition metal oxides selected from the group consisting of vanadium pentoxide, tungsten trioxide and titanium dioxide are present. Very particular preference is given to using copper in zeolites or zeolytic material. Zeolites or zeolytic material present in the SCR catalyst are those selected from the group consisting of Beta, Y, ferierite, ZSM-5, CHA, Sapo and mixtures thereof. Particularly preferred are Beta, CHA and Sapo. Most preferred are Cu or Fe exchanged CHA or Sapo-34 materials (EP2117707A, U.S. Pat. No. 7,645,718).

In order to capture excessive $NH_3$ which might nevertheless escape from the SCR catalyst, alternatively to arrange a separate oxidation catalyst downstream the SCR system, an oxidatively active zone may be established favourably on the outlet part of the SCR catalyst. The skilled worker knows how these types of catalysts are manufactured (EP1784258A; U.S. Pat. No. 5,120,695; EP1876331A).

A second possibility to mitigate $NO_x$ emissions is the usage of a so called nitrogen oxide storage catalyst for the $NO_2$ enriched exhaust gas. The nitrates formed by the intercalation of nitrogen oxides in the storage components can be decomposed to nitrogen oxides $NO_x$ as a result of the short-term enrichment of the exhaust gas, and reduced using carbon monoxide, hydrogen and hydrocarbons as reducing agents to nitrogen with formation of water and carbon dioxide over the catalytically active precious metals present.

The excellent properties of the nitrogen oxide storage catalyst achieved in this system with regard to the width of the temperature window, the storage efficiency and the aging stability are based on a high oxidative power of the hexagonal oxidation catalyst monolith. An even further oxidation step can be accomplished by the nitrogen storage catalyst itself. Here, preferably platinum is deposited on a support material composed of a homogeneously mixed oxide, e.g. Mg/Al, said support material preferably containing magnesium oxide in a concentration of from 1 to 40% by weight, based on the total weight of the Mg/Al mixed oxide, and, in a further advantageous configuration, being additionally dopable with cerium oxide or praseodymium oxide.

The storage components used in these types of catalysts are predominantly the basic oxides of the alkali metals, of the alkaline earth metals and of the rare earth metals, which react with nitrogen dioxide to give the corresponding nitrates. It is known that these materials are present under air usually in the form of carbonates and hydroxides. These compounds are likewise suitable for storing the nitrogen oxides. When reference is therefore made in the context of the invention to the basic storage oxides, this also includes the corresponding carbonates and hydroxides. Suitable support materials for the storage components are thermally stable metal oxides with a high surface area of more than 10 $m^2/g$, which enable highly dispersed deposition of the storage components. Suitable examples are cerium oxide and cerium-containing mixed oxides, aluminum oxide, magnesium oxide, magnesium-aluminum mixed oxides, rare earths and some ternary oxides.

Following patents and applications disclose several nitrogen oxide storage catalysts being preferably applicable in instant invention. WO2005092481A to the applicant describes a further nitrogen oxide storage catalyst which differs from that described in EP1317953A1 by an improved nitrogen oxide storage material. EP1016448B1 describes a catalyst for the cleaning of lean exhaust gases, which comprises a composite support oxide composed of alkaline earth metal oxide and aluminum oxide with a platinum structure layer applied thereto, the platinum clusters being dispersed homogeneously in a matrix composed of alkaline earth metal oxide. EP1321186B1 describes a nitrogen oxide storage catalyst in which the catalytically active noble metal, for example platinum, can be applied to an oxidic support material or directly to the $NO_x$ adsorbent.

The method of the present invention makes use of a certain oxidation catalyst monolith in front of a $NO_x$ depletion device and optionally a particulate trap. In view of the application of an SCR catalyst system as a $NO_x$ depletion device the trap can be either positioned in front of both devices just mentioned (WO2009129903), downstream of them (WO12123660 A1, WO10109100 A1) or in-between the SCR catalyst (EP2466084 A1). In the alternative, a system layout like depicted in EP1054722B1 may be chosen, where the filter is positioned between the oxidation catalyst monolith and the SCR catalyst system. Preferably, in the method of the present invention exhaust gas of lean burn engines is conveyed over a respective oxidation catalyst monolith located upstream of the ammonia SCR catalyst system and the optional particulate trap is arranged either between the oxidation catalyst monolith and the ammonia SCR catalyst system or arranged downstream of the ammonia SCR catalyst system. Particularly preferred is a setup in which the trap is downstream of the SCR catalyst system. A further possibility is to assemble the SCR catalyst and the particle filter in one device called SDPF. Examples are given in DE10323607; DE10238770; EP1663458; WO2011128026; EP2042227; EP2117681. This layout is in particularly useful for smaller vehicles having less space available below the cabin.

In lean combustion engines whose exhaust gas cleaning system, apart from a nitrogen oxide storage catalyst, may also comprises a hexagonal oxidation catalyst monolith positioned preferably close to the engine and a particulate filter, it may be advantageous to arrange the particulate filter immediately downstream of the oxidation catalyst monolith preferably also close to the engine, such that the nitrogen oxide storage catalyst has to be accommodated more on the downstream side of the particulate filter in the underbody area of the vehicle. This can, for example, facilitate the attainment of the soot ignition temperature during the particulate filter regeneration. Also here for reasons of space restrictions it may be versatile to position the nitrogen storage catalyst on the particulate filter in the exhaust train either in a position close to the engine or in the underbody of the vehicle (JP2002336656A2). Particulate traps or filters which appear to be suitable to a person skilled in the art can be employed for the purposes of the present invention. In general, the filters are constructed as described in WO0102083A under the name "Downstream Filter". Further possible embodiments of particle filters are mentioned in WO2006021336A, EP2181749A, WO2009103699A.

The filter may carry an oxidation catalyst, in particular the one used also for the hexagonal oxidation catalyst monolith of this invention. Especially, if the filter is arranged directly downstream of the oxidation catalyst monolith a synergistic cooperation in oxidative activity can be achieved when distributing the precious metals over the hexagonal oxidation catalyst monolith and the filter in a certain way (WO2012079598A; EP1815112A). In case of applying an oxidatively active filter, oxidizable constituents of the exhaust gas flowing through the particle filter are oxidized in the presence of available oxygen. In this way, hydrocarbons and carbon monoxide and also NO still present can be further converted at least partly into $CO_2$, $H_2O$ or $NO_2$. The oxidatively active particle filter has the primary task of filtering out both relatively large and relatively small soot particles from the exhaust gas. The filter therefore has to be freed of the soot particles at appropriate times so as not to become blocked. This is achieved by oxidation of the soot particles collected in the filter by means of the oxygen present or by $NO_2$ formed by the oxidatively active filter itself (CRT® effect) or by the oxidative catalyst monolith upstream of the filter in the exhaust gas. The above-described oxidation of the particles in the particle filter can thus be effected either continuously (e.g. by means of the above-described CRT® effect) or discontinuously by increasing the exhaust gas temperature. Temperatures which lead to rapid burn-off of the soot collected in the particle filter, also known as regeneration of the particle filter, are normally about 600° C. These high temperatures are usually achieved only by additional heating measures such as after-injection of fuel or late combustion.

As said, the oxidation of these soot particles is aided further by the filter itself having an oxidative action. This can be achieved by a filter containing an oxidatively active catalyst coating. The latter can be located either in the filter or on the filter surface (washcoat on the walls or in pores of the wall). An advantageous embodiment is one in which the particle filter as mentioned above is additionally coated with an oxidation catalyst on the entry side of the filter. This firstly reduces the light-off temperature for combustion of the soot on the coated filter and secondly enables the desired CRT® effect to be advantageously displayed.

As oxidatively active catalyst coating, it is possible for a person skilled in the art to use, for example, those described in WO2008101585A or in the doctoral thesis by Stephan Liebsch, TU Dresden 2004. The particle filter and in particular the oxidative coating mentioned preferably comprises metals such as platinum, palladium, gold, rhodium or mixtures thereof, which are then advantageously applied to high-surface-area support materials. Greater preference is given to using platinum-palladium mixtures. A person skilled in the art will select the appropriate mixing ratio of the metals, if appropriate as a function of the proportion of oxidizing species in the exhaust gas and the temperature regime to be adhered to. The oxidatively active coating of the particle filter (1) can preferably have a molar ratio of platinum to palladium in the range from 1:0 to 1:2, in particular from 6:1 to 1:2. If the filter is positioned downstream of the SCR catalyst system and carries an oxidatively active material the installation of a $NH_3$-slip catalyst on the SCR catalyst is of course not necessary which is most advantageous from a cost perspective.

As embodiments of the particle filter which is used according to the invention and which may comprise a component as described above, it is possible to use any of the filter bodies composed of metal and/or ceramic materials as are conventional in the prior art. These include for example metallic fabric and knitted filter bodies, sintered metal bodies and foam structures composed of ceramic materials. Use is preferably made of porous wall-flow filter substrates composed of cordierite, silicone carbide or aluminium titanate. Said wall-flow filter substrates have inflow and outflow ducts, with in each case the outflow-side ends of the inflow ducts and the inflow-side ends of the outflow ducts being closed off, offset with respect to one another, with gas-tight "plugs".

Figure 4:
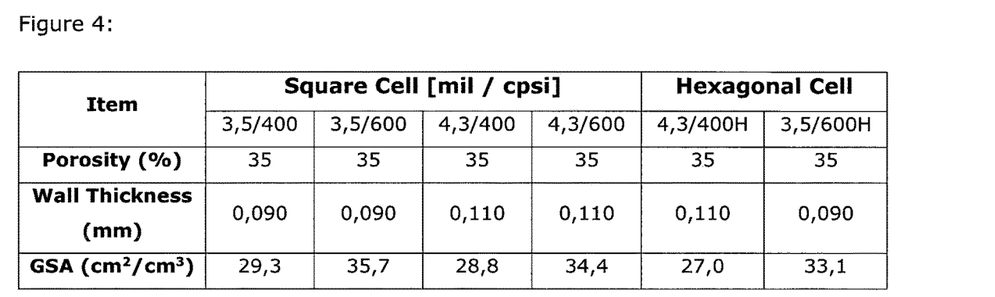
FIG. 4: table with characteristic indicators of some rectangular and hexagonal monoliths; it is stressed that the GSA of hexagonal cell monoliths is lower than that of rectangular cell monoliths having same cell densities.

For monolithic carriers special key indicators are defined to describe it, like e.g.:
Geometric Surface Area (GSA): Surface of the monolith per volume The present invention has achieved to operate an exhaust gas purification process embracing substantial advantages by means of relatively simple measures. The hexagonal geometry of the oxidation catalyst monolith (2) helps to reach the critical $NO_2/NO_x$ ratios more advantageously preferably in the low temperature region. Hence, mitigation of $NO_x$ emissions over a $NO_x$ depletion catalyst, e.g. an SCR catalyst or a nitrogen oxide storage catalyst is increased compared to well known rectangular monolith designs. With respect to the GSA one has to notice that despite similar characteristics (cell density, wall thickness, cell width, length) of the monolith in question the hexagonal geometry offers less geometric surface area (GSA) compared to a rectangular monolith (FIG. 4). It is, therefore, quite astonishing that less surface area serves for an increased catalytic activity here with otherwise same washcoat loads. Hence, a process using hexagonal oxidation catalyst monoliths having the advantages described cannot be derived in an obvious fashion from the prior art. The fact that these advantages are achieved by means of relatively small modifications to the standard exhaust gas purification process is all the more surprising.

DRAWINGS

(1) optionally oxidatively active particle filter
(2) oxidation catalyst monolith
(3) SCR catalyst system comprising:
(3a) external reducing agent source, e.g. tank for urea solution
(3b) metering apparatus, e.g. injection nozzle
(3c) reduction catalyst (SCR catalyst)

EXAMPLES

As reported in the following tables, two distinct experiments were conducted. Two oxidation catalysts (Type A and Type B), each deposited respectively on hexagonal cells substrate and standard square substrates were evaluated, each catalyst having the same washcoat load and the same volume of 1.6 liter. The catalysts were composed having a lower concentration of platinum at the bottom of the washcoat than at the inner surface.

| Experience n° | 1 | | 2 | |
|---|---|---|---|---|
| Substrate cell type | square | hexagonal | square | hexagonal |
| Oxidation catalyst type | A | A | B | B |
| Vehicle n°/ageing n° | A/1 | | B/2 | |

After preparation, the 4 catalysts were aged on engine. Ageing number 1 is for vehicle A and ageing number 2 is for vehicle B. Each aging procedure is representative of the vehicle road durability. It is composed of various temperatures and gas flow cycles representing the various events that a catalyst has to withstand during its operation on vehicle. (For instance, full power conditions, filter regeneration . . . ).

After engine ageing step, each catalyst is mounted on a vehicle according to above table. Each vehicle is powered by a modern commercial diesel direct injection engine having a displacement of 1.6 liter, each one equipped with a turbocharger. The test of the oxidation catalyst consists of an evaluation according to the "NEDC" procedure ("NEDC" standing for "New European Driving Cycle". This cycle is used for emission certification in Europe). The oxidation catalyst is mounted in a close coupled position, meaning just behind the turbo charger (see FIG. 6).

All over the NEDC test cycle the catalyst is enduring various exhaust gas flow conditions under transient temperature and pollutants emissions, essentially CO, HC, CO2, H2O, particles, NO and NO2.

NO and NO2 are measured with a CLD analyzer.

Figure 8:
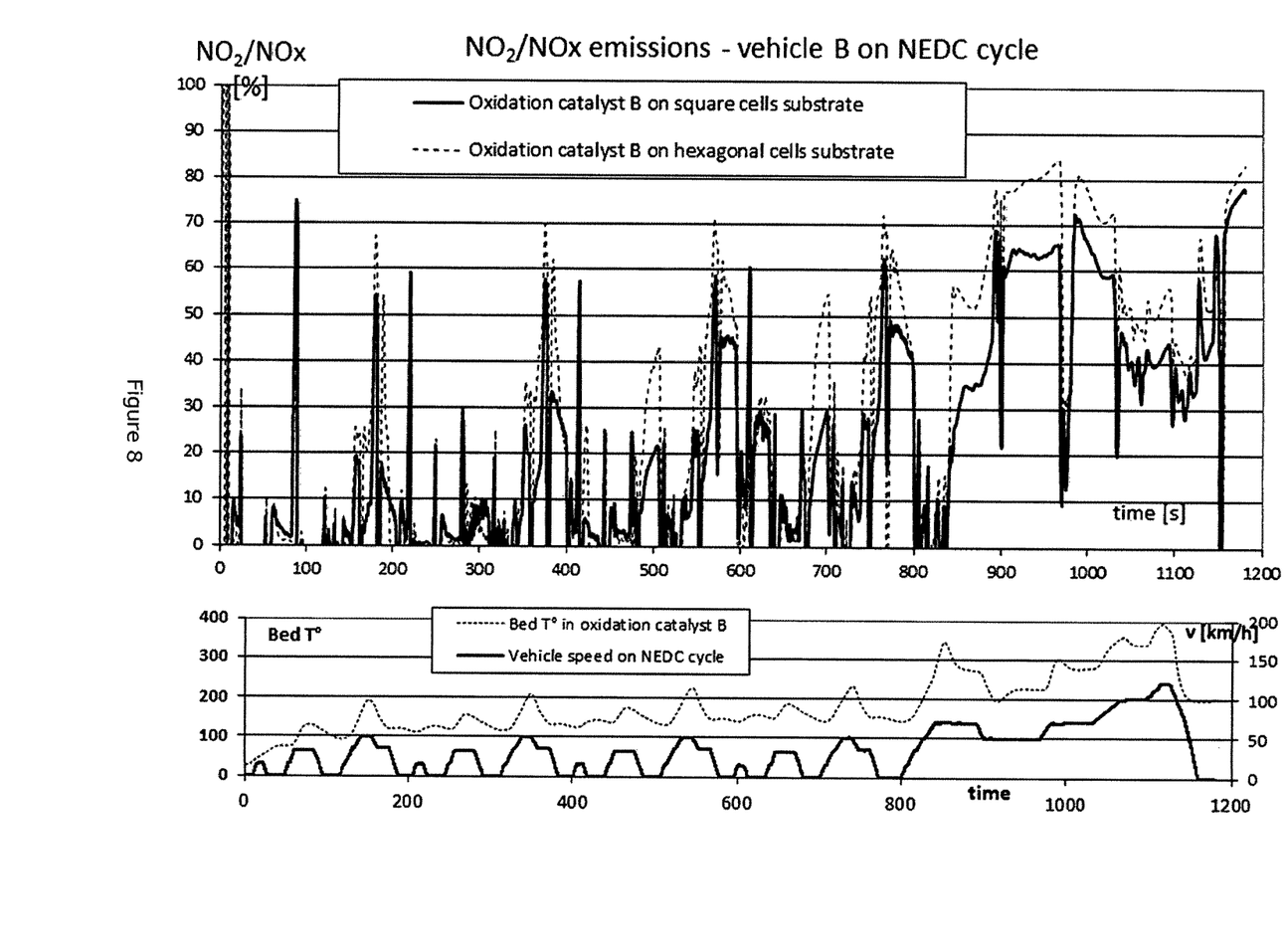
FIG. 8: comparison of $NO_2$ formation with oxidation catalyst B on hexagonal cells versus square cells on vehicle B; with Pt gradient

FIGS. 7 and 8 show the same trend on the 2 types of considered oxidation catalysts; the hexagonal square cell substrates are delivering higher NO2 content at the outlet of the catalyst than on square cell substrate. This phenomenon is occurring in particular when the exhaust gas temperature is above the 200° C. as reported in FIG. 2, in that case approximately after 700 seconds of vehicle run. In addition one notices a better transient behavior of the hexagonal oxidation catalyst monolith compared to the rectangular shaped catalyst.

Figure 10:
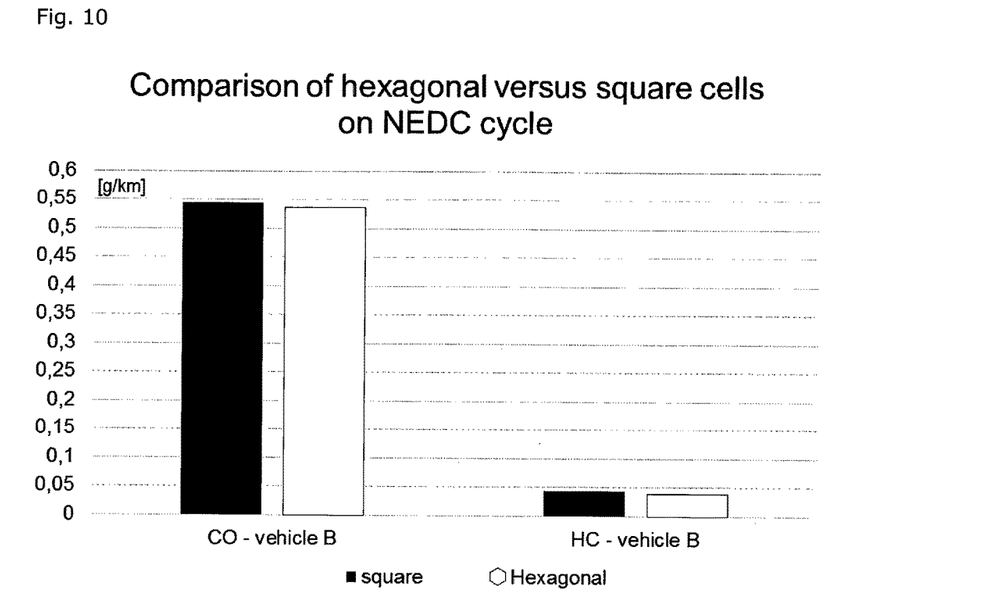
FIG. 10: experimental result of measurement of CO and HC conversion with hexagonal and rectangular oxidation catalyst monolith of same dimension and same washcoat at same load; with Pt gradient

HC and CO measurements were conducted also using the same experimental layout. It can be seen that HC and CO performance are nearly the same for hexagonal and square substrate catalysts (FIG. 10).

Comparative Examples

Mentioned experiments were repeated taking a homogeneous oxidation catalyst washcoat applied to hexagonal cells substrate and standard square substrates, respectively.

Figure 11:
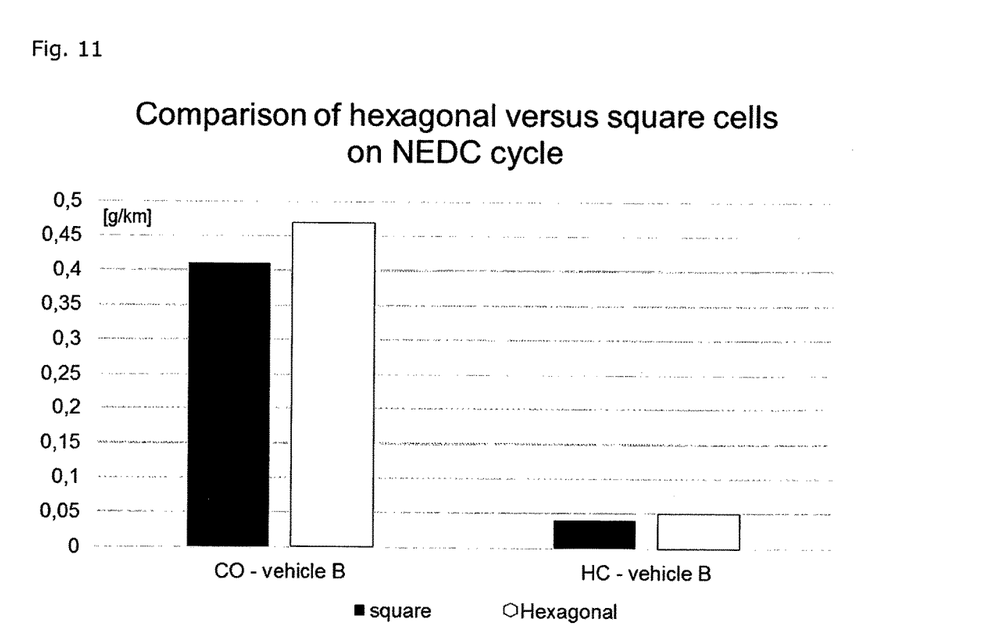
FIG. 11: experimental result of measurement of CO and HC conversion with hexagonal and rectangular oxidation catalyst monolith of same dimension and same washcoat at same load on vehicle B; without Pt gradient
Figure 12:
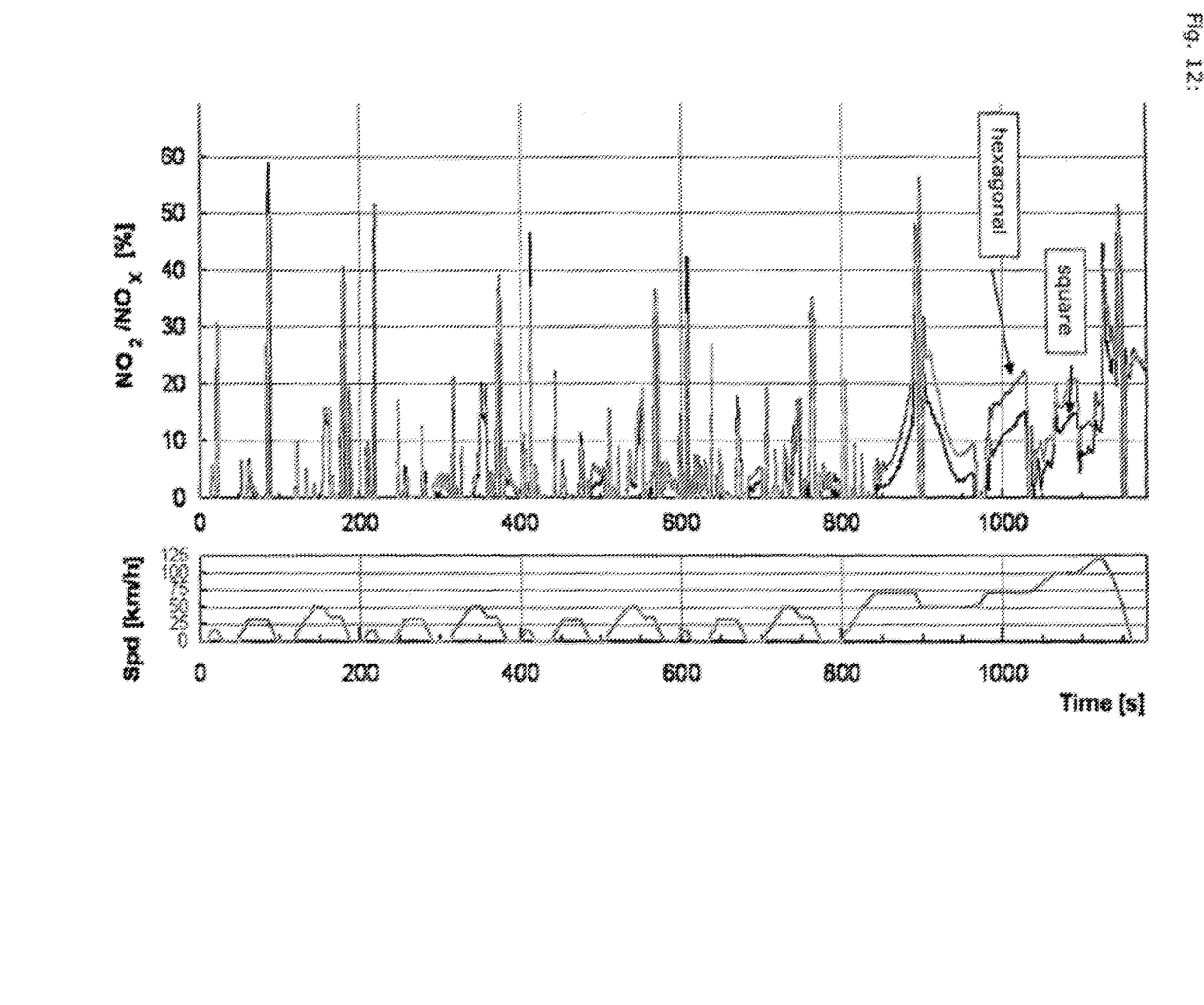
FIG. 12: comparison of $NO_2$ formation with oxidation catalyst on hexagonal cells versus square cells on vehicle B; without Pt gradient

It can be seen that the performance on NO2 generation shows the same trend compared to washcoats having a Pt gradient (FIG. 12). However, major drawbacks are visible when looking at the CO and HC conversion performance (FIG. 11).

The invention claimed is:

1. A method for abatement of noxious pollutants of lean combustion engines comprising
using an oxidation catalyst for the oxidation of hydrocarbons, carbon monoxides and nitrogen oxides in front of a $NO_x$ depletion device,
wherein the oxidation catalyst is in and/or on a flow-through monolith having hexagonal cell geometry and a washcoat of the oxidation catalyst has a gradient whereby:
a bottom region of the washcoat that is proximate to a surface of the flow-through monolith has a lesser platinum metal concentration as compared to a platinum metal concentration at a top region of the washcoat proximate to an exhaust gas flow region, and
the bottom region of the washcoat that is proximate to the surface of the flow-through monolith has a greater precious group metal concentration as compared to a precious group metal concentration at the top region of the washcoat proximate to the exhaust gas flow region.

2. The method according to claim 1, wherein the oxidation catalyst monolith has a cell density from 30-150 cells/cm$^2$.

3. The method according to claim 1, wherein the oxidation catalyst monolith has a length of from 3.5-30 cm.

4. The method according to claim 1, wherein the oxidation catalyst monolith has a wall thickness of from 50 to 250 μm.

5. The method according to claim 1, wherein the oxidation catalyst monolith has a cell width of from 0.5 to 9.5 mm.

6. The method according to claim 1, wherein the oxidation catalyst comprises precious group metals selected from the group consisting of platinum, palladium, gold and combinations thereof on high surface area refractory oxides.

7. The method according to claim 1, wherein the $NO_x$ depletion device is an ammonia SCR catalyst system or a $NO_x$ storage catalyst.

8. The method according to claim 1, wherein
the $NO_x$ depletion device is an ammonia SCR catalyst system, and the oxidation catalyst monolith is located upstream of the ammonia SCR catalyst system, and
a particulate trap is arranged either between the oxidation catalyst monolith and the ammonia SCR catalyst system or downstream of the ammonia SCR catalyst system, or the ammonia SCR catalyst system comprises a particulate trap that carries an ammonia SCR catalyst.

9. An exhaust aftertreatment system for abatement of noxious pollutants of lean combustion engines, comprising
an oxidation catalyst for the oxidation of hydrocarbons, carbon monoxides and nitrogen oxides and an $NO_x$ depletion device, the oxidation catalyst being positioned upstream of the $NO_x$ depletion device,
wherein the oxidation catalyst is in and/or on a flow-through monolith having hexagonal cell geometry and a washcoat of the oxidation catalyst has a gradient whereby:
a bottom region of the washcoat that is proximate to a surface of the flow-through monolith has a lesser platinum metal concentration as compared to a platinum metal concentration at a top region of the washcoat proximate to an exhaust gas flow region, and
the bottom region of the washcoat that is proximate to the surface of the flow-through monolith has a greater precious group metal concentration as compared to a precious group metal concentration at the top region of the washcoat proximate to the exhaust gas flow region.

10. The exhaust aftertreatment system according to claim 9, wherein the oxidation catalyst monolith has a cell density from 30-150 cells/cm$^2$.

11. The exhaust aftertreatment system according to claim 9, wherein the oxidation catalyst monolith has a length of from 3.5-30 cm.

12. The exhaust aftertreatment system according to claim 9, wherein the oxidation catalyst monolith has a wall thickness of from 50 to 250 μm.

13. The exhaust aftertreatment system according to claim 9, wherein the oxidation catalyst monolith has a cell width of from 0.5 to 9.5 mm.

14. The exhaust aftertreatment system according to claim 9, wherein the oxidation catalyst comprises precious group metals selected from the group consisting of platinum, palladium, gold and combinations thereof on high surface area refractory oxides.

15. The exhaust aftertreatment system according to claim 9, wherein the $NO_x$ depletion device is an ammonia SCR catalyst system or a $NO_x$ storage catalyst.

16. The exhaust aftertreatment system according to claim 9, wherein
the $NO_x$ depletion device is an ammonia SCR catalyst system, and the oxidation catalyst monolith is located upstream of the ammonia SCR catalyst system, and
a particulate trap is arranged either between the oxidation catalyst monolith and the ammonia SCR catalyst system or downstream of the ammonia SCR catalyst system, or the ammonia SCR catalyst system comprises a particulate trap that carries an ammonia SCR catalyst.

* * * * *